(No Model.)
H. ALLEN.
SPRING CUSHION TIRE FOR VEHICLES.
No. 595,131. Patented Dec. 7, 1897.
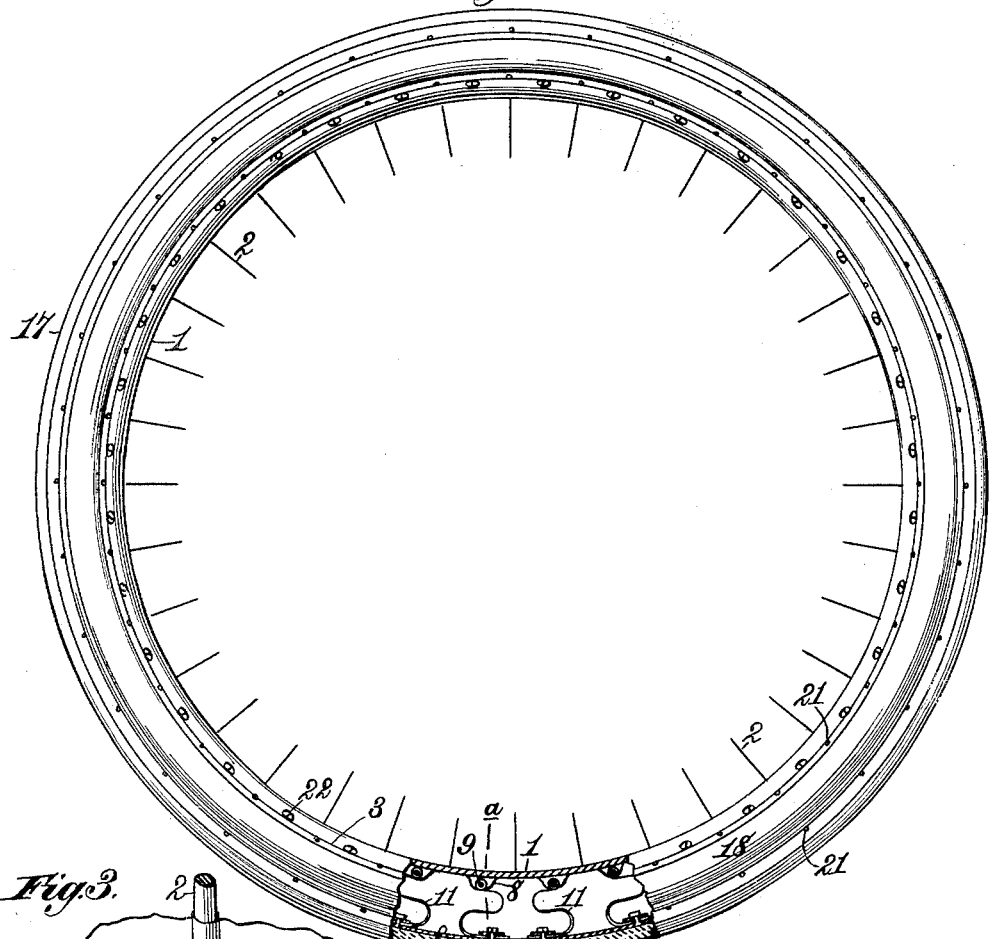
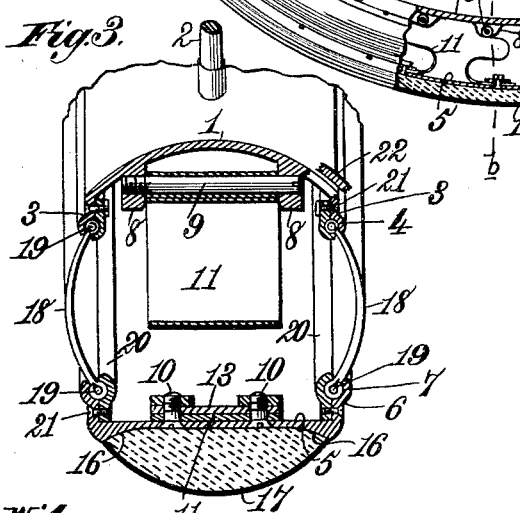
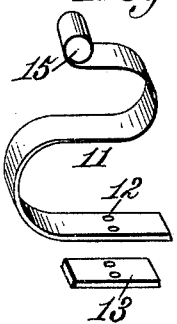
Witnesses:
Robert Emett
J. G. Meyers
Inventor:
Hans Allen,
By James L. Norris
Atty.

UNITED STATES PATENT OFFICE.

HANS ALLEN, OF RED WING, MINNESOTA.

SPRING-CUSHION TIRE FOR VEHICLES.

SPECIFICATION forming part of Letters Patent No. 595,131, dated December 7, 1897.

Application filed April 10, 1897. Serial No. 631,648. (No model.)

*To all whom it may concern:*

Be it known that I, HANS ALLEN, a citizen of the United States, residing at Red Wing, in the county of Goodhue and State of Minnesota, have invented new and useful Improvements in Spring-Cushion Tires for Vehicles, of which the following is a specification.

My invention relates to improvements in spring-cushion tires for bicycles, velocipedes, and other wheeled vehicles, and has for its object to provide a wheel-tire of this character of novel construction and having great efficiency for relieving or dissipating the disagreeable jarring to which such vehicles are subject in road-riding and to insure smooth, easy, and comfortable running, in connection with novel means for shielding, protecting, or housing the springs and their supports from injury from dust, dirt, gravel, or water.

A wheel provided with a tire of my invention furnishes a complete and efficient substitute for an ordinary pneumatic tire and has the advantage that it is puncture-proof, and it possesses advantages over spring-cushioned tires as constructed prior to my invention, as will be fully set forth herein.

To these ends my invention consists in the novel construction, combination, and arrangement of parts hereinafter fully set forth, and pointed out in the claim, reference being had to the accompanying drawings, in which—

Figure 1 is an elevation of a wheel provided with a tire of my invention, a part thereof being broken away to show the interior arrangement. Fig. 2 is a perspective view of one of the cushioning-springs and a clamp or securing-plate therefor. Fig. 3 is a transverse sectional view on the line $a\ b$, Fig. 1.

In the said drawings the reference-numeral 1 represents the rim of the wheel of a bicycle, velocipede, or other wheeled vehicle, to which the spokes 2 are secured in any well-known or usual manner. This rim is of the general shape usual in bicycles and velocipedes and at its side is provided with flanges 3. Said flanges are provided with annular grooves 4, as shown.

The numeral 5 represents a metallic plate which is arranged outside the wheel-rim and extends entirely therearound. This plate is provided with side flanges 6, similar to the flanges 3 of the rim 1 and having annular grooves 7.

The rim 1 is provided with depending brackets or eyes 8, one of which is screw-threaded to engage the screw-threaded end of a spring-securing bolt 9, as hereinafter described. These depending brackets and eyes are arranged at intervals entirely around the rim and are preferably located at points between adjacent spokes.

The metallic plate 5 is fitted with a pair of screw-lugs 10 at corresponding intervals, the heads of said lugs engaging squared holes in said plate, so that they are incapable of turning and are held practically immovable, the screwed ends of said lugs projecting toward the wheel-rim 1, as shown.

The cushion-springs are designated by the numeral 11 and are reversely curved or S-shaped, as illustrated, and provided in their lower legs with holes 12 to fit over a pair of screw-lugs 10 and be confined and firmly held thereon by a washer 13 and nuts, as best illustrated in Fig. 3 of the drawings. The other or upper leg of the spring is turned upon itself to provide a socket 15 to receive the bolt 9. The spring, as shown in Fig. 2 of the drawings, is thicker at its lower than at its upper end, and tapers gradually from the former to the latter, so that the effect of jarring caused by roughness of the road over which the vehicle passes is mainly borne by the lower portion of the spring and gradually distributes itself throughout the said spring toward the top, so that it is practically dissipated in the spring and is not transmitted to the wheel.

In practice the lower legs of the springs are secured to the screw-lugs 10, as hereinbefore described, and their upper ends are brought in between the corresponding brackets or eyes 8 until the socket 15 of the spring is in alinement with said eyes, when the bolt 9 is passed through one of said eyes and the socket in the spring and is screwed into engagement with the other of said eyes, as particularly shown in Fig. 3 of the drawings. In this way the springs are secured at their upper ends in such manner that they may have a movement about the bolt 9 when it is compressed in riding over rough roads or an obstacle in the road, and thus be saved from undue strain or liability of being broken. The several springs being secured, as described, entirely around the rim and metallic plate afford a very efficient spring-cushioned tire. The metallic plate 5 is of such diameter as compared with that of the rim 1 that the springs when adjusted in position are under slight tension or compression, thus preventing any tendency to rattle.

The outer surface of the metallic plate is provided with a seat 16, having a solid-rubber tread 17, which can be sprung into place in said seat, where it will be firmly held, as will be readily understood.

The numerals 18 indicate strips of rubber for protecting or housing the cushion-springs, and the means for securing them in place, from dirt, dust, or gravel, to which they would otherwise be exposed and thus liable to suffer injury by breakage or becoming clogged from free operation. The housing-strips also protect said parts from exposure to rain and consequent liability of oxidation or rusting. These strips 2 at their edges are turned about endless bands of wire, metal, or other suitable substance, the respective diameters of said bands being such that the strips are caused to bulge outward, as shown in Fig. 3 of the drawings.

The strips extend entirely around the wheel, spanning and covering the space between the rim 1 and the metallic plate 5, the endless bands 19 being disposed in the grooves 4 and 7 of said rim and plate, respectively, and being securely held therein by annular clamping-rings 20, which are provided with grooves corresponding to and coinciding with the grooves 4 and 7, before mentioned, so that when the rings are secured in the clamping position said coincident grooves form a seat which accurately fits the edges of the strips 18 and the incased bands 19. The clamping-rings are secured in position by screws 21, passing through the flanges 3 of the rim and 6 of the metallic plate and also through said rings at suitable intervals. These screws may be readily withdrawn and the strips, or one of them, removed if it be necessary to have access to the interior to adjust any spring or any of the securing parts.

The rim 1 is provided at points coincident with the heads of the bolts 9 with screw-plugs 22, which may be readily removed in order that if occasion arises any one of the bolts may be readily withdrawn therethrough.

By my invention I provide an improved spring-cushion tire which effectually relieves or dissipates the jar which is occasioned by the passage of the vehicle over rough roads and which has a rubber tread and in which all the springs and their securing devices are completely housed and protected from injury by dust, dirt, or gravel and rain. It is very important that the disagreeable jarring to which vehicles are subjected in traveling over rough roads should be effectually relieved or dissipated. Riders of bicycles especially realize this importance. The present pneumatic tires are objectionable in that they are easily punctured, and usually this accident happens at an inconvenient time or place, and when the tire is punctured it is useless. A tire constructed according to my invention is absolutely puncture-proof, while it otherwise serves as a complete substitute for the pneumatic tire and possesses this distinct advantage.

Having thus described my invention, what I claim is—

In a cushion-tire for wheeled vehicles, the combination with a wheel-rim provided with annularly-grooved flanges, of a surrounding metallic plate provided with similar annularly-grooved flanges, a series of springs interposed between said rim and plate, protecting or housing strips having incased bands disposed in the annular grooves of the rim and plate flanges, and grooved clamping-rings for confining said bands in said grooves, substantially as described.

In testimony whereof I have hereunto set my hand in presence of two subscribing witnesses.

HANS ALLEN.

Witnesses:
T. N. SIMMONS,
C. F. HJENNSTAD.